3,523,076
MICROWAVE IRRADIATION OF SEWAGE AND SEWAGE SLUDGE

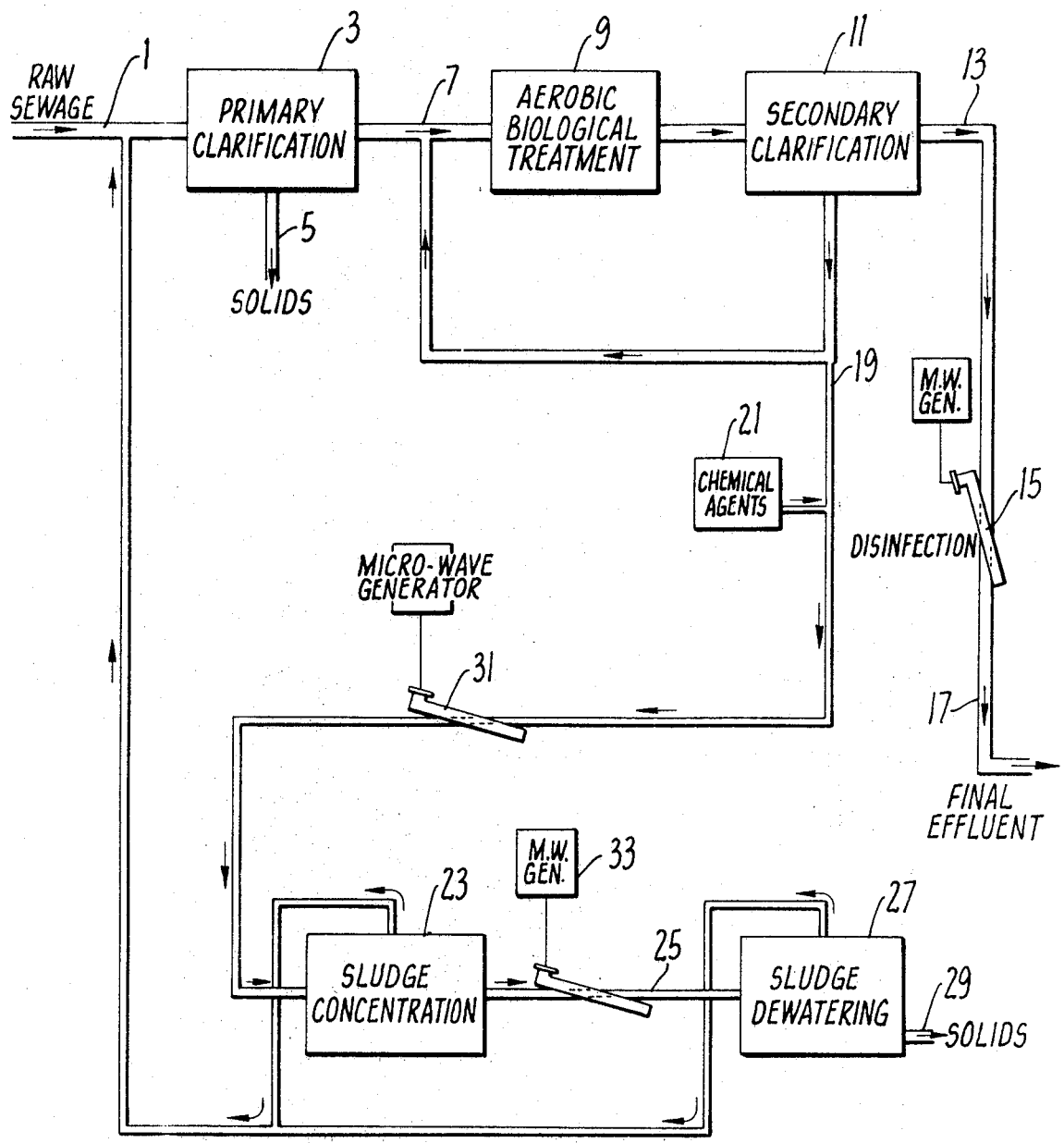

David J. Goerz, Jr., Menlo Park, and Byron H. Leonard, Jr., Atherton, Calif., assignors to Bechtel International Corporation, a corporation of Delaware
Filed July 30, 1968, Ser. No. 748,765
Int. Cl. C02c 3/00, 1/06
U.S. Cl. 210—10                                          3 Claims

ABSTRACT OF THE DISCLOSURE

The settlement rate of sewage or sewage sludge is increased at any stage of processing by exposing the same to microwave electormagnetic energy.

SUMMARY OF THE INVENTION

In processing sewage, the sewage is subjected to several processes to remove the solids therefrom so that the final effluent from the process consists essentially of pure water which can be discharged into a stream without contamination thereof. This is important both from the standpoint of avoiding contamination of streams and other bodies of water and also that valuable solids can be recovered from the sewage which make good fertilizer.

Since the volumes of raw sewage which must be treated are enormous, it is apparent that any method which assists in rapid settlement of solids from the sewage is very important from an economic standpoint. By using rapid settlement method of the present invention the necessary treatment equipment can be made smaller for a given throughput and the yield of solids as well as the purity of the effluent can be increased.

In the past, various methods have been suggested for the treatment of sewage to increase settleability and filterability of the sewage sludges. For instance, it has been suggested that irradiation with gamma rays or high energy beams would be suitable for this purpose. The use of radioactive isotopes to generate the radiation has also been suggested. However, these methods are relatively expensive and up to the present time have made no impression in the art.

In accordance with the present invention it has been found that microwave energy can be utilized to increase the settleability and the filterability of sewage and sewage sludges. The microwave energy can be applied at any stage during the processing of the sewage. Although it could be applied to raw sewage, ordinarily that is not economically desirable because of the dilute nature of the sewage and the fact that it contains many solids which settle rapidly without treatment. After primary clarification of the sewage, the sewage is ordinarily treated in an aerobic biological treatment system followed by secondary clarification to produce a relatively clear final effluent and a concentrated sludge dispersion. At this point, it is highly desirable to treat the sewage with microwave energy since this has been found to coagulate the sludge particles, greatly facilitating sludge concentration. Further, after the sludge concentration step, the sludge itself can be treated with microwave energy before it is subjected to the final dewatering and this also aids in the rapid settling and filtering of the sludge. Additionally, microwave energy can be employed on the effluent liquid during disinfection to facilitate this process.

The invention is one of broad applicability and can be applied at various stages to the treatment of sewage.

BRIEF DESCRIPTION OF THE DRAWING

The sole figure of the drawing is a block diagram of a typical sewage treatment process illustrating the application of microwave energy to the process.

DESCRIPTION OF THE PREFERRED EMBODIMENTS

The drawing consists of a block diagram illustrating a typical flow through a sewage treatment plant also illustrating where the microwave energy can be applied to greatest advantage. In the drawing, raw sewage is introduced through line 1 where it is passed through a primary clarification tank 3. This is merely a large tank with rakes in the bottom wherein the solids are allowed to settle and are scraped off the bottom. The solids are removed through line 5 and the liquid is passed through line 7 to an aerobic biological treatment device 9. This device is one wherein the liquid is contacted with a large volume of air such as by spraying the liquid onto checkerwork where a large surface is exposed to the air or by bubbling air through the liquid or a combination of these methods. In such a treatment, bacteria and protozoa act on the sewage in the presence of oxygen to oxidize the same into a sludge-like mass. This is passed through a secondary clarifier 11 which can be similar in structure to clarifier 3. The liquid effluent which is now essentially free of solids as well as organic matter is passed through line 13 to a disinfection step 15 and it can be discharged as relatively clean water through line 17.

The solids removed from the secondary clarifier 11 are brought to line 19 where they may be treated with chemical agents, as is well known to those skilled in the art, at 21 and passed through a sludge concentration step 23. The concentrated sludge is then removed through line 25 to a final sludge dewatering process 27 and the solids can be discharged through 29.

The microwave treatment step of the present invention can be applied at various stages of the treatment process. Although it could be applied to the raw sewage, this is a relatively expensive treatment and the quantity is so large, that it is ordinarily not economically desirable to apply microwave energy to the raw sewage. However, the liquid coming off the secondary clarification is relatively concentrated and contains about 2% solid. Therefore, the microwave energy can be advantageously applied as is shown at 31 and this greatly increases the settling rate in the concentrator 23. The liquid effluent from the sludge concentration is, of course, even further concentrated and a microwave generator 33 can be employed to treat the concentrated sludge to prior final dewatering where it greatly increases the filtration rate.

In addition, it has been found that the microwave energy increases the effectiveness of the disinfection step so that a microwave applicator may be employed as at 15 within the disinfector.

This invention is not predicated an any theory of its operation but it is believed that the effect of the microwave energy is to depolarize solid particles which have like charges within the sewage. Particles having such charges may be brought about by the addition of polyelectrolyte during the chemical treatment steps or may be inherent in the sludge itself. When the particles have like charges they obviously will repel each other and such particles will stay suspended almost indefinitely. However, by depolarizing the particles, the charges are either removed or neutralized so that the particles can come together and coalesce which naturally increases the settling rate by the formation of relatively large particles.

By microwave energy is meant energy in a frequency range of 300 mHz. to 30 gHz. The ISM frequency of 2450 mHz. has proved entirely suitable for use at the present invention.

In order to demonstrate the utility of the present invention, a number of tests were made.

Example 1

Waste activated sludge from the secondary clarifier of the San Jose, Calif., sewage treatment plant was obtained. This material was divided into two samples, one of which was subjected to microwave energy for 20 milliseconds. The microwave energy was generated at a power level of 30 kw. at a frequency of 2450 mHz. The two samples were placed in 100 ml. graduates and settling was observed at minute intervals. In the following table, the numbers indicate the amount of cloudy liquid in the graduate.

| Time of Day: | Control Sample | Microwave Sample |
|---|---|---|
| 10:15 a.m. | 100 | 100 |
| 10:30 | 100 | 99 |
| 10:45 | 100 | 98 |
| 11:00 | 99 | 97 |
| 11:15 | 99 | 96 |
| 11:30 | 98 | 95 |
| 12:50 p.m. | 97 | 86 |
| 1:30 | 97 | 81 |
| 2:15 | 96 | 75 |
| 3:00 | 96 | 70 |
| 3:30 | 96 | 67 |
| 4:15 | 96 | 63 |

It can be seen from the above, that after settling equal periods of time, the control sample still had 96% of cloudy liquid while that which had been treated with the short burst of microwave energy had only 63% of cloudy liquid.

Example 2

A test was run similar to that of Example 1. Here the samples were exposed to microwave energy at the same power level and frequency as in Example 1 but for various lengths of time. Samples were exposed for lengths of time of 2 milliseconds, 4 milliseconds, 10 milliseconds, 20 milliseconds, 200 milliseconds, and 1,000 milliseconds. Observations were made from time to time to determine coagulation. A control which was not exposed to the microwave energy showed that coagulation had barely started after standing for three hours. The samples exposed from 2 and 4 milliseconds, showed visible coagulation in slightly over an hour and in two hours the coagulation was very apparent. In the case of the sample exposed at 200 milliseconds, coagulation was well advanced in less than two hours. In the sample exposed at 1,000 milliseconds, boiling was observed and coagulation was immediate.

We claim:
1. In the processing of sewage wherein the sewage is subjected to primary and secondary clarification steps and sludge solids are removed in the latter step the improvement comprising passing the removed solids to a concentrating stage and applying microwave energy to the solids to increase the settlement rate.
2. The process of claim 1 wherein the microwave energy is applied after a sludge concentration step.
3. The process of claim 1 wherein the microwave energy is applied at a frequency of from 300 mHz. to 30 gHz.

References Cited

UNITED STATES PATENTS 3,220,945   11/1965   Torpey _____ 210—10 X
3,272,338   9/1966   Gallagher _____ 210—152 X

OTHER REFERENCES

Dunn, C. G.: Treatment of Water and Sewage by Ionizing Radiations, Sewage and Industrial Wastes, vol. 25, November 1953, pp. 1277–1281.

Spragg, H. R.: Atomic Radiation in Sewage Processing, Water and Sewage Works, vol. 110, May 1963, pp. 163–164.

MICHAEL E. ROGERS, Primary Examiner

U.S. Cl. X.R.

210—64